Dec. 23, 1952  G. C. RAY  2,623,072
SEPARATION OF CYCLOPENTANONE
Filed Sept. 27, 1946
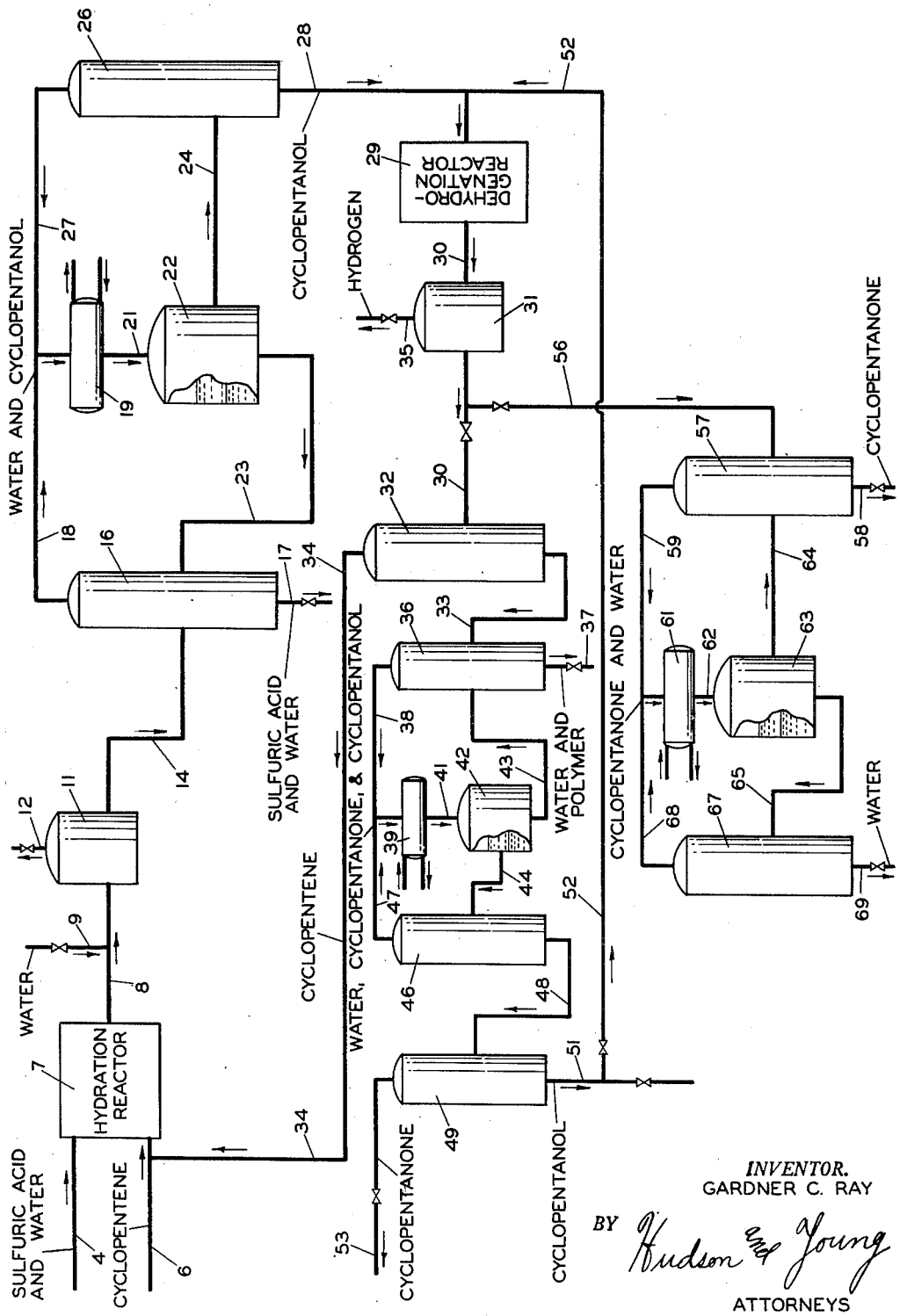
INVENTOR.
GARDNER C. RAY
BY Hudson & Young
ATTORNEYS Patented Dec. 23, 1952

2,623,072

UNITED STATES PATENT OFFICE 2,623,072

SEPARATION OF CYCLOPENTANONE

Gardner C. Ray, Bartlesville, Okla., assignor to Phillips Petroleum Company, a corporation of Delaware Application September 27, 1946, Serial No. 699,665

2 Claims. (Cl. 260—586)

This invention relates to a distillation process. In one aspect this invention relates to the separation of a cycloalkanol, such as cyclopentanol, and/or a cycloalkanone, such as cyclopentanone, from water. In still another aspect this invention relates to a process for the manufacture of an oxygenated cycloalkyl.

Cyclopentanol and cyclopentanone are highly valuable organic compounds used as explosives intermediates, solvents, organic synthesis intermediates, etc. Commercial processes involving their production and purification are, therefore, desirable. In the course of the production or utilization of these compounds, they are often obtained admixed with appreciable quantities of water, and in some cases, water-soluble, non-volatile acids or alkalis are also present.

An object of this invention is to provide a continuous process for the recovery of cyclopentanol and/or cyclopentanone from their aqueous solutions.

Another object of this invention is to provide a method for separating the components of a mixture comprising cyclopentanol, cyclopentanone and water.

Still another object of this invention is to provide a process for the manufacture and purification of cyclopentanone.

A further object of this invention is to provide a process for the manufacture and purification of cyclopentanol.

A still further object is to provide a process for the removal of water from a solution of an oxygenated cycloalkyl.

Other objects and advantages will become apparent from the accompanying description and disclosure.

The drawing represents a diagrammatic showing of apparatus adapted to carry out the invention.

In ordinary distillation at atmospheric pressure, cyclopentanone and cyclopentanol have normal boiling points of about 130° C. and about 140° C., respectively. Since water has a normal boiling point of 100° C., it would appear that water could be readily distilled from the alcohol or ketone. However, I have found, much to my surprise, that upon distilling solutions of either these compounds in water, constant-boiling mixtures are produced each of which has a normal boiling point slightly below that of water. I have discovered that cyclopentanone and water distil simultaneously at 92.6° C. at a pressure of 740 mm. of mercury to produce a distillate having a composition of about 64 volume per cent cyclopentanone and about 36 volume per cent water. I have further discovered that cyclopentanol and water boil simultaneously at a temperature of 96.1° C. at a pressure of 748 mm. of mercury to produce a distillate comprising about 43 volume per cent cyclopentanol and about 57 volume per cent water.

Upon determining the solubility of cyclopentanol and of cyclopentanone in water and of water in cyclopentanol and in cyclopentanone at 80° F., I have also found that the partial solubility relationships exist as shown in Table I.

TABLE I

| Cyclopenta-none in water, vol. percent | Water in cyclopentanone, vol. percent | Cyclopentanol in water, vol. percent | Water in cyclopentanol, vol. percent |
|---|---|---|---|
| 29.6 | 13.8 | 9.6 | 16.8 |

Upon cooling and condensing either the cyclopentanone-water azeotrope or the cyclopentanol-water azeotrope from their normal boiling temperatures to 80° F., two liquid phases result, a water-rich phase and an organic compound-rich phase. A considerable concentration of cyclopentanone or cyclopentanol results from the azeotropic distillation of somewhat dilute aqueous solutions of either the ketone or the alcohol. If desired, the upper or organic phase of the condensed azeotropic distillates may be redistilled to produce a quantity of anhydrous ketone or alcohol since insufficient water is present in these phases to form an azeotropic mixture with all the ketone or alcohol present.

If quantities of non-volatile acids or bases, such as sulfuric acid or sodium hydroxide, are present, it is sometimes advantageous to introduce additional water into the aqueous mixtures containing cyclopentanol or cyclopentanone prior to azeotropic distillation. Reducing the concentration of the acid or base present in this manner oftentimes eliminates the occurrence of undesirable side reactions, such as the dehydration of the alcohol, polymerization of the ketone, esterification of the alcohol, and the like.

In view of the above discoveries, a solution of water and a cycloalkanol and/or a cycloalkanone, the alcohol and the ketone possessing partial solubility with water and preferably containing a single ring having not more than six carbon atoms per molecule, is separated into its components by a series of continuous azeotropic distillation steps. Since two liquid solutions of water and the organic compounds exist, that is, one solution in which water is the solvent and the organic compounds are the solute and the other solution in which either or both of the organic compounds are the solvent, this invention is equally applicable to the separation and recovery of the components of either solution. In separating the components of such solutions, the liquid solution is introduced into a first distillation zone and the solvent is removed therefrom as the bottom product and substantially an azeotropic mixture of water and the organic compound is removed therefrom as an overhead product. The overhead product is condensed and allowed to separate into two liquid phases, a solvent-rich phase and a solute-rich phase. The solvent-rich phase is returned to the first distillation zone and the solute-rich phase is introduced into a second distillation zone and a bottom product comprising the solute and an overhead product comprising substantially an azeotropic mixture of water and the organic compound are removed therefrom. This overhead fraction from the second distillation zone is also condensed and separated into two liquid phases in the same step as the overhead from the first distillation zone. If either the solute or the solvent withdrawn as a bottom product comprises a mixture of a ketone and an alcohol, this mixture may be separated into its components in a third distillation step.

The above data for the phase relationships and the properties of the mixture of water, alcohol and ketone will vary somewhat with pressure and alterations or changes in pressure to gain similar results is within the scope of this invention.

As an example of the application of the knowledge imparted by this invention, a process for the production and purification of cyclopentanol and cyclopentanone will be described with reference to the drawing accompanying this application. Although the azeotropic properties of cyclopentanol and cyclopentanone with water are especially applicable to the processes to be described, the accompanying description should not be construed to limit the application of this invention to such a process. According to the drawing, cyclopentene and sulfuric acid together with water are introduced into hydration reactor 7 through lines 6 and 4, respectively. The cyclopentene feed may be obtained from various sources, such as petroleum refinery processes. When using about 65 to about 75 per cent sulfuric acid, appropriate reaction conditions for effecting the hydration of the cyclopentene are a temperature of about 75 to about 85° F. at atmospheric pressure and a residence time of about 2 to 3 hours. With such conditions the conversion of cyclopentene to cyclopentanol is about 50 to about 80 per cent per pass. A liquid effluent from reactor 7 is passed therefrom through line 8 and admixed with water entering line 8 through line 9. Water is added to the effluent in order to hydrolyze the sulfuric acid esters and to sufficiently dilute the acid to prevent or minimize side reactions (as alcohol dehydration) during subsequent distillation steps. The resulting aqueous mixture is cooled (not shown) and is then passed to separator 11 wherein a liquid organic phase and liquid aqueous phase are formed. The lighter organic phase comprising polymers and unreacted hydrocarbons, and other side reaction products is removed from separator 11 through line 12 and discarded, if desired, or distilled to recover cyclopentanol if an appreciable quantity is present. The aqueous phase which contains sulfuric acid and cyclopentanol and which has been diluted to about a 5 to 10 per cent concentration of acid is passed through line 14 to distillation zone 16. Water and sulfuric acid substantially free from cyclopentanol are withdrawn from distillation zone 16 as a bottom product through line 17 and water and cyclopentanol are withdrawn as an overhead product through line 18. The aqueous sulfuric acid withdrawn from column 16 through line 17 may be reconcentrated by distillation and returned to reactor 7 for reuse in promoting the hydration reaction. As previously stated, the overhead azeotropic mixture has a composition of about 43 volume per cent cyclopentanol and about 57 volume per cent water. The overhead fraction is condensed and separated into two liquid phases by passing the stream through condenser 19, line 21 into accumulator 22. The upper cyclopentanol-rich phase containing about 16.3 volume per cent water is passed to a second distillation zone 26 through line 24 for further fractionation. The lower aqueous phase in settler 22 containing about 9.6 volume per cent cyclopentanol is returned to column 16 through line 23, preferably to the feed plate of that column.

In distillation column 26 a second separation is made between cyclopentanol and water; and azeotropic mixture of cyclopentanol and water is withdrawn overhead from column 26 through line 27 and recycled through condenser 19 to separator 22. This azeotropic mixture is similar in composition to the azeotropic overhead mixture of column 16 and therefore can be separated into two phases in a similar manner as the overhead in column 16. Since insufficient water is present in the feed to column 26 to form an azeotropic mixture with all the cyclopentanol present, cyclopentanol substantially free from water is withdrawn as a liquid from column 26 through lines 28 and 52 as a product of the process. The approximate boiling point of the cyclopentanol-water azeotrope is about 96° C. while the boiling point of cyclopentanol itself is about 140° C.; thus it is apparent that the separation between the cyclopentanol and the azeotrope may be effected with ease in column 26.

When cyclopentanol is not the desired product but is an intermediate product in the production of cyclopentanone, cyclopentanol is passed through line 28 to reactor 29 in which the cyclopentanol is converted to cyclopentanone. The conversion of cyclopentanol to cyclopentanone is effected in the presence of a catalyst, such as nickel or brass. Since the conversion products, aside from cyclopentanone, are somewhat different depending upon the catalyst, the purification of the conversion effluent must be effected accordingly. When nickel is used as the catalyst, the conversion is carried out at a temperature of about 260° C. at about atmospheric pressure. The normally liquid portion of the conversion effluent under certain conditions comprises approximately the composition shown in Table II below.

TABLE II

| Component: | Volume percent |
| --- | --- |
| Cyclopentene | 5 |
| Cyclopentanol | 20 |
| Cyclopentanone | 20 |
| Water | 50 |
| Polymers | 5 |

The conversion effluent from reactor 29 is passed therefrom through line 30 to a gas separator 31 in which hydrogen is separated from the liquid effluent. From gas separator 31 the liquid conversion effluent is passed to a first distillation zone 32. In distillation zone 32 the cyclopentene is separated from the conversion effluent as an overhead product and is recycled to reactor 7 through line 34 and line 6. The bottom product from distillation zone 32 comprising cyclopentanol, cyclopentanone, water and polymers is passed to a second distillation zone 36 through line 33. In distillation zone 36, substantially an azeotropic mixture of water and cyclopentanol, and water and cyclopentanone is distilled overhead while water and polymers are removed from distillation zone 36 as a bottom product through line 37. The overhead fraction from distillation zone 36 passes through line 38 to condenser 39 and thence through line 41 to separator or accumulator 42. The resulting condensate is separated into two liquid phases in separator 42, an upper organic phase comprising a major proportion of cyclopentanone and cyclopentanol and a lesser proportion of water and a lower aqueous phase comprising a major proportion of water with minor proportions of cyclopentanone and cyclopentanol. The aqueous phase is returned to distillation zone 36, preferably to the feed plate thereof, by means of line 43. The upper organic phase is passed from separator 42 through lnie 44 to a third distillation zone 46. A mixture of water, cyclopentanol and cyclopentanone is passed overhead from distillation zone 46 through line 47 and passed to condenser 39 and separator 42 to be separated into two liquid phases as previously described. The bottom product from distillation zone 46 comprises cyclopentanone and cyclopentanol substantially free from water. This bottom product is passed through line 48 to a fourth distillation column 49 to be separated into an overhead fraction comprising cyclopentanone which is removed through line 53 and a bottom fraction comprising cyclopentanol which is removed through line 51. The cyclopentanol may be recycled to reactor 29 through line 52, if desired. Since the boiling point of cyclopentanone is about 130° C. and the boiling point of cyclopentanol is about 140° C. the separation of the ketone and alcohol in distillation zone 49 is effected with ease. In some instances it may be desirable to return a portion of the organic phase in separators 22 and 42 as a liquid reflux to the top columns 16 and 36, respectively, thereby decreasing the number of trays necessary in the rectification section of the columns.

When brass is used as the catalyst for the conversion of the cyclopentanol to cyclopentanone at about 300-325° C. and one atmosphere pressure, the conversion is about 95 per cent, accompanied by the formation of very little water, cyclopentene, and other by-products. Although the contamination of the cyclopentanone with other compounds, such as cyclopentene, cyclopentanol, etc. is small, sufficient water may be present to warrant its removal, but in a different manner than previously described with regard to the conversion using a nickel catalyst. When a brass catalyst is used, the conversion effluent is passed from line 30 through line 56 to a first distillation zone 57 in which an overhead product comprising cyclopentanone and water along with traces of cyclopentene and a bottom product comprising cyclopentanone with traces of cyclopentanol and polymers are formed and withdrawn therefrom. The overhead product is passed from distillation zone 57 through line 59 to condenser 61 and then through line 62 to separator or accumulator 63. The bottom product comprising cyclopentanone substantially free from water is withdrawn through line 58 as a product of the process. In separator 63 an upper organic phase comprising cyclopentanone and about 13.8 volume per cent water is separated from a lower aqueous phase comprising about 29.6 volume per cent cyclopentanone. The upper organic phase is returned to distillation zone 57 through line 64 and the aqueous phase is passed to a second distillation column 67 through line 65. Substantially an azeotropic mixture of cyclopentanone and water is withdrawn as an overhead product from distillation zone 67 through line 68 and is passed to condenser 61 and separator 63 for separation into two liquid phases as previously described. Water is withdrawn from distillation column 67 from line 59 to keep cyclopentene from building up in the system.

In a similar manner, this invention may be applied to a process for the manufacture of cyclohexanol and cyclohexanone and to the separation of such compounds from their aqueous solutions.

The following examples are offered as exemplary of the separation described in this application, and should not be considered unnecessarily limiting to this invention.

*Example I*

The separation of cyclopentanone from a dilute aqueous solution by batchwise azeotropic distillation is illustrated by the data of Tables III and IV below:

TABLE III

Charge:
  60.0 cc. cyclopentanone
  230 cc. distilled water
Reflux ratio: 10:1
Column: Approximately 35 equivalent theoretical plates

| Cut No. | Total Vol. in fraction, c.c. | Vol. of H₂O phase, c.c. | Vol. of ketone phase, c.c. | Vol. percent H₂O in ketone phase | Vol. percent ketone in H₂O phase | Total ketone in both phases, c.c. |
|---|---|---|---|---|---|---|
| 1 | 16.5 | 7.7 | 8.8 | 11.2 | 34.6 | 10.5 |
| 2 | 13.5 | 6.0 | 7.5 | 11.2 | 34.3 | 8.7 |
| 3 | 34.0 | 16.0 | 18.0 | 11.0 | 34.7 | 21.5 |
| 4 | 25.0 | 11.5 | 13.5 | 11.1 | 34.7 | 16.0 |
| 5 | 13.5 | 13.5 | | | 23.6 | 3.2 |
| 6 | 22.0 | 22.0 | | | .4 | .1 |
| 7 | 11.0 | 11.0 | | | | |

TABLE IV

| Cut No. | Accum. vol. percent of ketone charge distilled overhead | Vol. percent ketone in the azeotrope | Accum. vol. percent of charge distilled overhead | Overhead temp., ° C., at end of cut | Barometer, mm. hg |
|---|---|---|---|---|---|
| 1 | 17.5 | 64.3 | 5.7 | 92.62 | 739.6 |
| 2 | 32.0 | 64.4 | 10.3 | 92.62 | 739.6 |
| 3 | 67.8 | 64.3 | 22.1 | 92.62 | 739.6 |
| 4 | 94.6 | 64.0 | 30.7 | 92.65 | 739.8 |
| 5 | 99.9 | | 35.7 | 98.4 | 739.6 |
| 6 | 100 | | 43.3 | 99.2 | 740.3 |
| 7 | 100 | | 47.1 | 99.2 | 740.3 |

By redistilling the combined ketone phases from cuts 1 to 4, cyclopentanone-water azeotrope is obtained as an overhead fraction, and substantially pure cyclopentanone is recovered as a kettle residue.

*Example II*

The separation of cyclopentanol from a dilute aqueous solution by batchwise azeotropic distillation is illustrated by the data of Tables V and VI below:

TABLE V

Charge:
27.0 cc. pure cyclopentanol; 273 cc. distilled water (9.0 vol. percent cyclopentanol)
Column: 36 plates
Reflux ratio: 10:1

| Cut No. | Total volume in cut, c. c. | Vol. of H$_2$O phase, c. c. | Vol. of alcohol phase, c. c. | Vol. percent H$_2$O in alcohol phase | Vol. percent alcohol in H$_2$O phase | Total alcohol in both phases, c. c. | Total H$_2$O in both phases, c. c. |
|---|---|---|---|---|---|---|---|
| 1 | 29.5 | 16.5 | 13.0 | 16.0 | 11.0 | 12.7 | 16.8 |
| 2 | 24.5 | 13.5 | 11.0 | 15.5 | 10.9 | 10.7 | 13.8 |
| 3 | 12.5 | 10.0 | 2.5 | 16.0 | 11.0 | 3.2 | 9.3 |
| 4 | 37.0 | 37.0 | | | | | 37.0 |
| 5 | 20.0 | 20.0 | | | | | 20.0 |

TABLE VI

| Cut No. | Accum. vol. percent of charge distilled | Overhead temp. at end of cut, °C. | Barometer, mm. Hg | Accum. vol. percent of alcohol recovered overhead | Accum. vol. percent of alcohol recovered in alcohol phase | Vol. percent alcohol in the azeotrope |
|---|---|---|---|---|---|---|
| 1 | 9.8 | 96.08 | 748 | 51 | 41 | 43 |
| 2 | 18.0 | 96.12 | 747.5 | 93 | 75 | 43 |
| 3 | 22.1 | 99.40 | 747.0 | 99 | 83 | |
| 4 | 34.5 | 99.35 | 745.0 | 99 | 83 | |
| 5 | 42.2 | 99.35 | 744.0 | 99 | 83 | |

Residue: 163 cc.=53.5 vol. percent of charge.
Distillation loss: 4.3 vol. percent of charge.

By redistilling the combined alcohol phases from cuts 1 to 3, cyclopentanol-water azeotrope is obtained as an overhead fraction, and substantially pure cyclopentanol is recovered as a kettle residue.

Various modifications and alterations of this invention may become apparent to those skilled in the art for the separation and purification of cyclopentanol and cyclopentanone without departing from the scope of this invention.

I claim:

1. In a process for the manufacture of cyclopentanone by the dehydrogenation of cyclopentanol under conditions such that water is formed as a by-product and forms a water-rich solution with the cyclopentanone product, the method for purifying the cyclopentanone product which comprises introducing such a liquid solution into a first distillation zone, removing from said first distillation zone a bottom product comprising water and an overhead product comprising substantially an azeotropic mixture of cyclopentanone and water, condensing said overhead product from said first distillation zone to form a liquid cyclopentanone-rich phase and a liquid water-rich phase, returning said water-rich phase to said first distillation zone, passing said cyclopentanone-rich phase to a second distillation zone, removing an overhead product comprising substantially an azeotropic mixture of cyclopentanone and water from said second distillation zone and passing same to the aforesaid condensation step, and removing a bottom product comprising cyclopentanone from said second distillation zone as a product of the process.

2. A continuous process for the separation and recovery of dissolved cyclopentanone from a water-rich solution containing the same, which comprises introducing such a liquid solution into a first distillation zone, removing from said first distillation zone a bottom product comprising water and an overhead product comprising substantially an azeotropic mixture of cyclopentanone with water, condensing said overhead product from said first distillation zone to form a liquid cyclopentanone-rich phase and a liquid water-rich phase, returning said water-rich phase to said first distillation zone, passing said cyclopentanone-rich phase to a second distillation zone, removing an overhead product comprising substantially an azeotropic mixture of cyclopentanone and water from said second distillation zone and passing same to the aforesaid condensation step, and removing a bottom product comprising cyclopentanone from said second distillation zone as a product of the process.

GARDNER C. RAY.

REFERENCES CITED

The following references are of record in the file of this patent:

UNITED STATES PATENTS

| Number | Name | Date |
|---|---|---|
| 1,394,232 | Stevens | Oct. 18, 1921 |
| 1,911,832 | Lewis | May 30, 1933 |
| 2,290,636 | Deanesly | July 21, 1942 |
| 2,368,497 | Shipley et al. | Jan. 30, 1945 |
| 2,414,646 | Hepp | Jan. 21, 1947 |
| 2,417,635 | Davis | Mar. 18, 1947 |
| 2,439,513 | Hamblet et al. | Apr. 13, 1948 |

FOREIGN PATENTS

| Number | Country | Date |
|---|---|---|
| 315,012 | Germany | Oct. 23, 1919 |

OTHER REFERENCES

Randall et al., "Fractionation of partially miscible liquids," 31 Industrial and Engineering Chemistry, 1181–1186 (September 1939).

Othmer, "Partial pressure processes," 33 Industrial and Engineering Chemistry, 1106–1112 (September 1941).